United States Patent [19]
Hornung et al.

[11] Patent Number: 5,898,827
[45] Date of Patent: *Apr. 27, 1999

[54] ROUTING METHODS FOR A MULTINODE SCI COMPUTER SYSTEM

[75] Inventors: Bryan D. Hornung, Plano; Bryan D. Marietta, Austin, both of Tex.

[73] Assignee: Hewlett-Packard Co., Palo Alto, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/720,331

[22] Filed: Sep. 27, 1996

[51] Int. Cl.$^6$ .............................. G06F 11/00; G06F 13/00
[52] U.S. Cl. ................................. 395/182.09; 395/200.69; 395/200.73
[58] Field of Search .................... 395/182.02, 182.09, 395/200.15, 200.11, 200.1, 200.69, 200.68, 200.7, 200.71, 200.72, 200.73, 200.74; 370/217, 351; 364/949.91

[56] References Cited

U.S. PATENT DOCUMENTS

| | | | |
|---|---|---|---|
| 4,797,882 | 1/1989 | Maxemchuk | 370/94 |
| 5,125,076 | 6/1992 | Faber et al. | 395/182.02 |
| 5,341,504 | 8/1994 | Mori et al. | 395/182.02 |
| 5,471,623 | 11/1995 | Napolitano, Jr. | 395/200.03 |
| 5,539,621 | 7/1996 | Kikinis | 361/803 |
| 5,606,551 | 2/1997 | Kartalopoulos | 370/406 |
| 5,613,073 | 3/1997 | Hammond, Jr. et al. | 395/250 |

OTHER PUBLICATIONS

Cha et al., "Simulated Behavior of Large Scale SCI Rings and Tori", Parallel & Distributed Processing 5th Symposium, IEEE, pp. 266–274, 1993.

Gustavson et al., "Overview of the Scalable Coherent Interface, IEEE STD 1596 (SCI)", Nuclear Science Symposium and Medical Imaging Conference, IEEE, pp. 488–990, 1992.

Latifi et al., "On Link Disjoint Hamiltonian Cycles of Torus Networks", Southeastcon Proceedings, IEEE, 1993.

Primary Examiner—Joseph E. Palys

[57] ABSTRACT

A multi-dimensional node or processor arrangement allows a similar number of nodes in a linear array to be arranged in a more compact form, thus overcoming a latency problem in communications between the most distant nodes/processors. The multi-dimensional arrangement also allows for multiple paths between nodes. This feature greatly improves survivability of the system, such that when one node dies there is always at least one other path that is available to get to the other nodes in the system. Thus, the system can continue to run and only the resources of the one node that died are lost. A first set of routing rules governs the migration of communications between a source node and a destination node around the node array when all of the nodes are functioning. A secondary set of rules displaces or modifies the first set when a node is not functioning.

8 Claims, 3 Drawing Sheets

ROUTING METHODS FOR A MULTINODE SCI COMPUTER SYSTEM

RELATED APPLICATIONS

This application is related to application Ser. No. 08/720,330, filed Sep. 27, 1997 entitled METHOD AND SYSTEM FOR MAINTAINING STRONG ORDERING IN A COHERENT MEMORY SYSTEM; application Ser. No. 08/720,368, filed Sep. 27, 1996, ERROR CONTAINMENT CLUSTER OF NODES; and application Ser. No. 08/720,332, filed Sep. 27, 1997, entitled TIME OF CENTURY COUNTER SYNCHRONIZATION USING A SCI INTERCONNECT; all filed concurrently with this application, and hereby incorporated by reference herein. These applications are commonly assigned.

TECHNICAL FIELD OF THE INVENTION

This invention relates in general to multi-processor computer systems and in particular to methods for routing packets in a multinode, multi-processor system.

BACKGROUND OF THE INVENTION

Prior art multinode, multi-processor computer systems utilized one dimensional interconnect, or a linear array. This arrangement had two major problems. The first problem was the increased latency caused by the linear array. Extreme timing problems would occur when a processor on one side of the array attempts to access the resources of a processor on the far side of the linear array.

The second problem is related to the survivability of the system. If one node or processor dies or otherwise becomes unusable, the system would degenerate into a plurality of individual nodes or processors. The individual nodes would no longer share resources, more specifically, the nodes cannot access the resources, such as disk drives, CD drives, or other I/O devices, that are resident on other nodes.

SUMMARY OF THE INVENTION

A multidimensional node or processor arrangement will overcome these problems. A two dimensional format is the simplest version. More complex versions would include three or more dimensional arrangements.

The multidimensional arrangement allows a similar number of nodes in a linear array to be arranged in a more compact form, thus overcoming the latency problem. More specifically, instead of arranging 28 nodes in a linear 1×28 format, the nodes would be placed in a 4×7 format. In a 1×28 format the most distant nodes are 27 places apart, while in a 4×7 arrangement the most distant nodes are only 9 places apart.

The two dimensional arrangement also allows for multiple paths between nodes. This feature greatly improves survivability of the system. In a linear array, if one node suffers a hardware failure or die, the remaining nodes are cut off from each other. Thus, the linear system is essentially broken into a plurality of smaller, independent systems. However, in a two dimensional array, when one node dies there is always at least one other path that is available to get to the other nodes in the system; therefore, the system can continue to run and only the resources of the one node that died are lost.

A first set of routing rules governs the migration of communications between a source node and a destination node around the node array when all of the nodes are functioning. A secondary set of rules displaces or modifies the first set when a node is not functioning.

A technical advantage of the present invention is the use of a multidimensional nodal array.

Another technical advantage of the present invention is the use of a base set of rules for transitions around the array when the array is rectangular and all of the nodes are functioning.

A further technical advantage of the present invention is the use of a secondary set of rules that modify the base set for transitions around the array when the array is non-rectangular or when one of the nodes or rings has failed.

A further technical advantage of the present invention is use of the node CSR to store secondary information used by the secondary set of rules.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DESCRIPTION OF THE PREFERRED EMBODIMENTS

Figure 1:
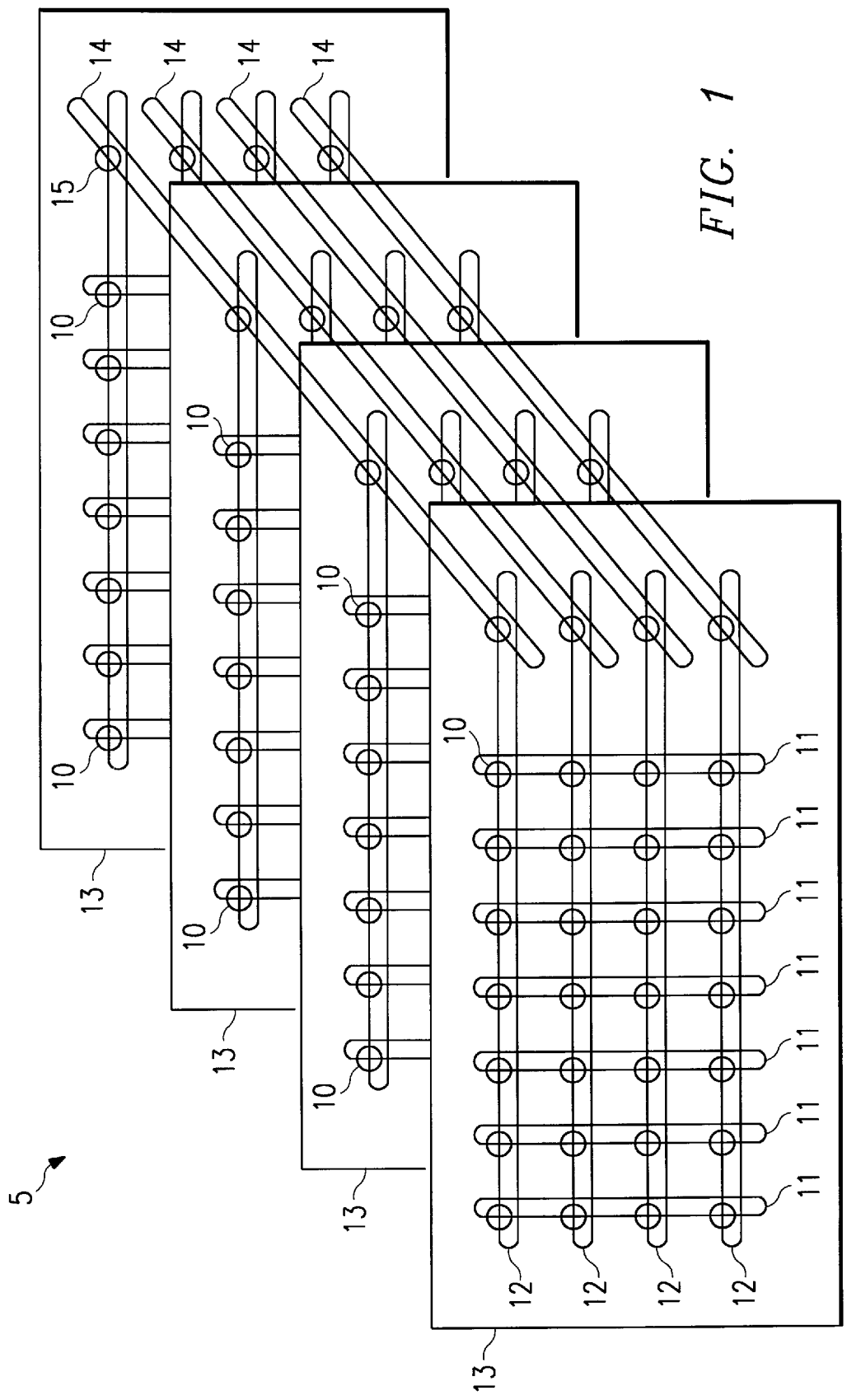
FIG. 1 is a schematic diagram of a 4×4×7 node arrangement, yielding a total 128 nodes.

The multinode, multi-processor computer system may have as many as 112 nodes. FIG. 1 shows a 112 node system 5. The nodes 10 are organized in seven X-dimension rings 11 by four Y-dimension rings 12 forming a 28 node wall 13. Four of such walls are interconnected by four Z-dimension rings 14. A bridge node 15 is used to connect a Y-dimension ring 12 to a Z-dimension ring 14. The different nodes may be partitioned into clusters to improve system survivability, this is be discussed in the co-pending application entitled "ERROR CONTAINMENT CLUSTER OF NODES" filed Sep. 27, 1996, Ser. No. 08/720,368, which is herein incorporated by reference.

Each node can support up to sixteen processors. These processors are connected to processor agent chips or PACs. The function of the PACs is to transmit requests from the processors through a cross bar router chips (RACs) and to the memory access chips (MACs) and then forward the responses back to the requesting processor. The MACs control access to the coherent memory. When the processor generates a request to access memory or other resource, a PAC sends the request through a RAC to a MAC. If the request is destined for a memory on the local node, the MAC accesses the memory attached to it. If the request is destined for memory on another node, the MAC forwards the request to the TAC. A method for maintaining cache coherency is discussed in the co-pending application entitled "METHOD AND SYSTEM FOR MAINTAINING STRONG ORDERING IN A COHERENT MEMORY SYSTEM" filed Sep. 27, 1996, Ser. No. 08/720,332, which is herein incorporated by reference.

Figure 2:
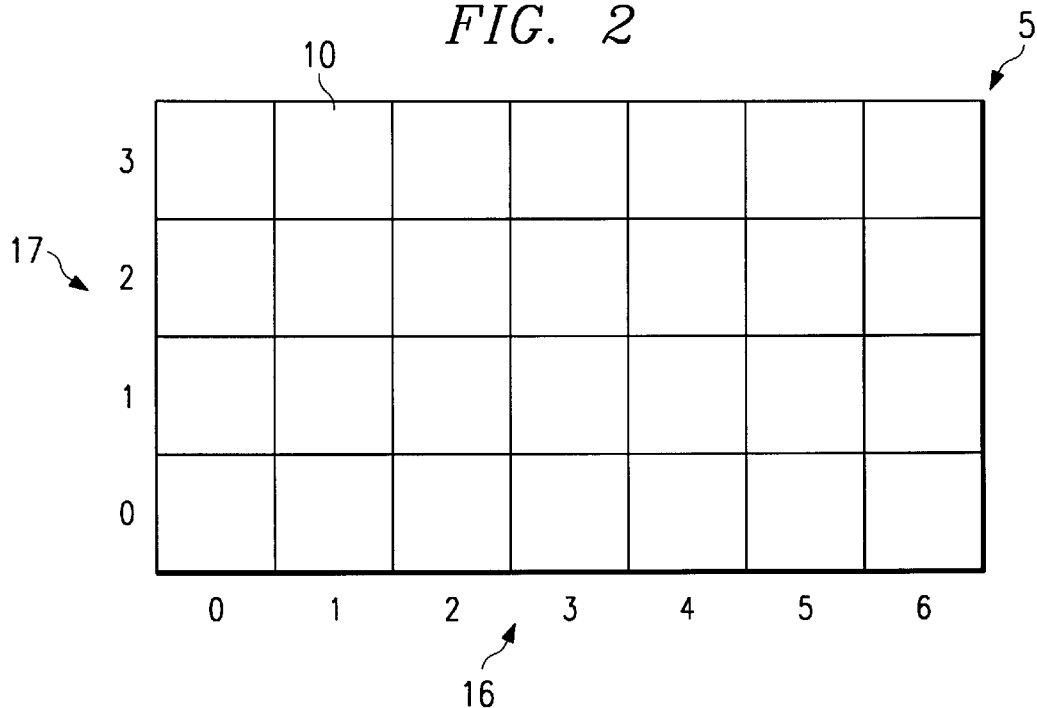
FIG. 2 is a simpler form of the arrangement of FIG. 1.

FIG. 2 depicts a simpler form of the system 5 of FIG. 1. Each block represents a node 10. The nodes are arranged in a two dimensional array, the third dimension is not shown. The node IDs that are assigned correspond to these individual nodes, the columns are the X-IDs 16 and the rows are the Y-ID 17. The walls, not shown in FIG. 2, would be the Z-IDs. Therefore, the lower left node is the 0,0 node, and the upper right node is the 3,6 node. The IDs would change as transitions are made from row-to-row and from column-to-column. This arrangement allows the node ID bits to be assigned as follows: bits 0–2=column; 3–4=row; and 5–6=wall. A special extended row mode would change the wall filed into columns allowing systems up to 4×28. For this mode, bits 5–6 are used as additional column X-dimension address bits.

This array 5 requires a method or rule set to allow any node to communicate with any other node. The node IDs are assigned using the geographical approach described above, i.e. the node address indicates a ring position relative to the node being visited by a data packet. Partial rings are not used so that all rings contacting a failed node are lost. The rule set may have different paths for requests and responses, i.e. responses do not backtrack on the path of the request. The rule set will allow for non-rectangular or "strange" node configurations. The strange configurations are not as fault tolerant as rectangular configurations.

The routing rule set for a M×N rectangular system with all nodes operating or the base method, is as follows:

1) Sender: If outgoing packet is on the same column (X) and wall (Z) or there is no X, then send on Y, else send on X.
2) Switch: Switch X to Y if incoming packet column matches switch column, and matches switch wall and Y ring exists.
3) Wall Switch: Switch from current wall to the next wall if wall address does not match, regardless of the column and row address.

Using these rules, the column ID is compared to send something to a different node. If the column ID matches the packet it will be forwarded out on the Y ring (row) to the a different node in that same column. If the column ID does not match, it will be sent out on the X dimension (column) and will be forwarded to a different node on that same row. Then each node on the row will check the incoming address and if it matches the total address, then it is that destination node. If it just matches the column ID, the packet will switch the request to the Y ring (row), and then be forwarded up the Y ring (row). Each node will check for an address match.

An array can be rotated such that rows become columns and columns become rows, such that the above method could be changes so that row IDs are first checked for an ID match. If it matches, the packet is then forwarded out on the X ring (column) to the a different node in that same row. If the row ID does not match, it will be sent out on the Y dimension (row) and will be forwarded to a different node on that same column. This will work for a two-dimensional array, but not the three dimensional array shown in FIG. 1. This is because the bridge nodes are located at the ends of each row. If the bridge nodes were to be located at the ends of each column, then row ID checking first variation would be the preferred method.

Figure 3:
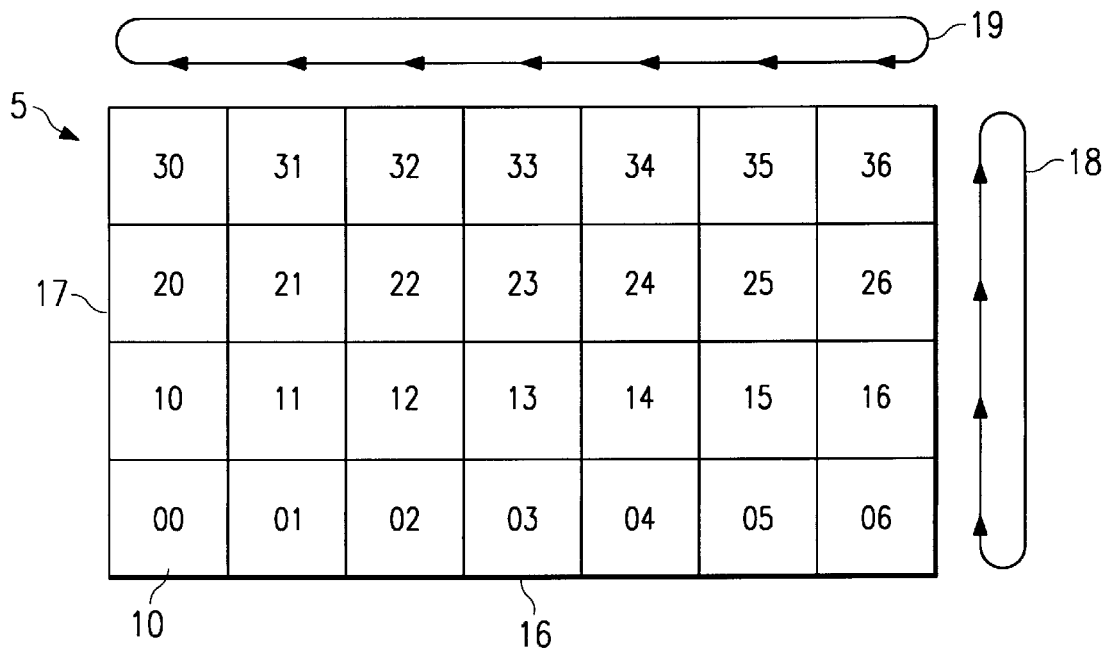
FIG. 3 is an example of the routing method for a fully functioning node array.

An example of the base method is shown in FIG. 3 and detailed below. The numbers in the nodes 10, indicate the row and column location, in that order, for that specific node. The walls are not shown. Loop 18 depicts the direction of rule permitted travel about the Y IDs 17. Loop 19 depicts the direction of rule permitted travel about the X IDs 16. The source or requesting node is the 06 node, and destination node is the 22 node.

The request path:
Step 1 Rule 1: move from node 06 to 05.
Step 2 Rule 2: move from node 05 to 04.
Step 3 Rule 2: move from node 04 to 03.
Step 4 Rule 2: move from node 03 to 02.
Step 5 Rule 2: switch from node 02 to 12.
Step 6 Rule 2: move from node 12 to 22.

The response path:
Step 1 Rule 1: move from node 22 to 21.
Step 2 Rule 2: move from node 21 to 20.
Step 3 Rule 2: move from node 20 to 26.
Step 4 Rule 2: switch from node 26 to 36.
Step 5 Rule 2: move from node 36 to 06.

If a node fails, or if the arrangement is that of a strange array, the base method will not function. If a node fails, no other nodes in the column or row of the failed node can be accessed with the rings attached to the failed node.

The modified version of the base rules will allow the system to function with a failed node or if the arrangement is that of a strange array. This version will work from any configuration, but has non-optimal ring crossings for some source-destination pairs.

The modified routing rule set is as follows:

1) Sender: If outgoing packet is on the same wall (Z) and (column (X) or secondary column) or there is no X, then send on Y, else send on X.
2) Switch: Switch X to Y if incoming packet matches column and wall or if incoming packet matches secondary column and wall.
3) Switch: Switch Y to X if incoming packet matches row and wall or if incoming packet matches secondary row and wall.
4) Wall Switch: Switch from current wall to the next wall if wall address do not match, regardless of the column and row address.

Figure 4:
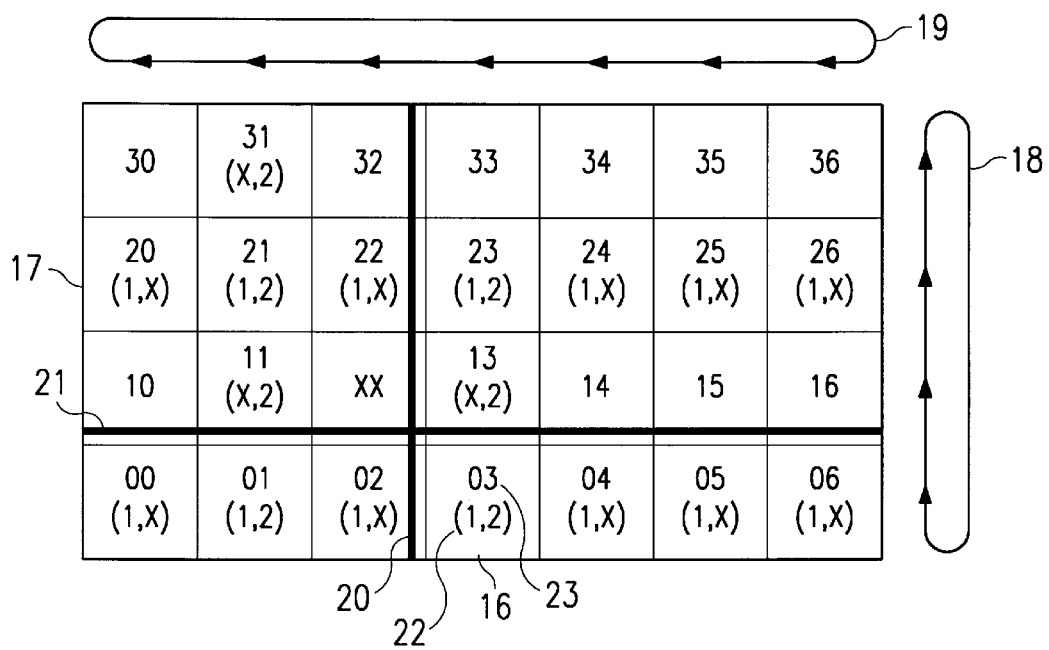
FIG. 4 is an example of the routing method for an array with a failed node.

An example of the modified method is shown in FIG. 4 and detailed below. The walls are not shown. Loop 18 depicts the direction of rule permitted travel about the Y IDs 17. Loop 19 depicts the direction of rule permitted travel about the X IDs 16. The source or requesting node is again the 06 node, and destination node is again the 22 node. Node 12 has failed. The SCI rings in the X and Y dimensions that are shown with the solid lines 20, 21 are no longer available because they run through the failed node. Therefore, we cannot use either of those rings in the routing method. In FIG. 4, an upper set of numbers 23 is specific node address, indicating the row and column location, in that order. The lower set of numbers 22 is secondary information. The letter "x" appearing in place of a row or column number indicates that the secondary switch is disabled for that node.

The request path:
Step 1 Rule 1: move from node 06 to 05.
Step 2 Rule 2: move from node 05 to 04.
Step 3 Rule 2: move from node 04 to 03.

Step 4 Rule 2: switch from node 03 to 13.
Step 5 Rule 3: move from node 13 to 23.
Step 6 Rule 3: move from node 23 to 22.
The response path:
Step 1 Rule 1: move from node 22 to 21.
Step 2 Rule 2: move from node 21 to 20.
Step 3 Rule 2: move from node 20 to 26.
Step 4 Rule 2: switch from node 26 to 36.
Step 5 Rule 3: move from node 36 to 06.

Even though node 12 failed, it is desirable to use the resources on nodes 02, 22, 32, as well as nodes 10, 11, 13, 14. These nodes are currently only connected with one dimension of the SCI ring, and thus unreachable with the base method. The base method would have tried to use those particular rings.

To get around this we have modified the base method to include steps that allows matching on either a secondary column ID or a secondary row ID. This allows the use of rings that would not ordinarily be used in routing from one position to another.

In FIG. 4, the base method would have immediately forwarded the packet out to 05 from 06, then to 04, to 03, to 02, and at 02 would then attempt to switch to 12, but that no longer works because that particular set of rings is dead. The standard algorithm simply compares the incoming node ID to the node ID of the node and uses that to decide in which dimension or whether to switch, or to forward it, or to accept the packet. The modified or secondary routing method now uses two additional sets of information.

The secondary method has a second column address and second row address that are contained in the configuration and status register or CSR for each node. When this secondary information is enabled, secondary information is compared to the incoming packet to determine whether to switch or not.

In this example depicted in FIG. 4, the secondary method begins the same as the base method shown in FIG. 3. A column check is first performed to determine if the current column matches the destination column. Since it does not match, the packet is sent on in the X dimension from 06 to 05. The column does not match, so the packet it is sent to 04. Since 04 is not a match, the packet is sent to 03. The node 03 would not yield a match in the base method, but the secondary information has been enabled. The node 03 has secondary row, column information of 12 labeled 22 in FIG. 4. This matches the column and thus switches from the X dimension to the Y dimension. The packet is switched from node 03 to node 13. A switch from Y to X can not occur because node 12 is dead thus, the packet is moved from node 13 to 23. At node 23, the secondary information matches and the packet is switched from 23 to 22. Thus, the packet has been successfully routed around the failed node.

Figure 5:
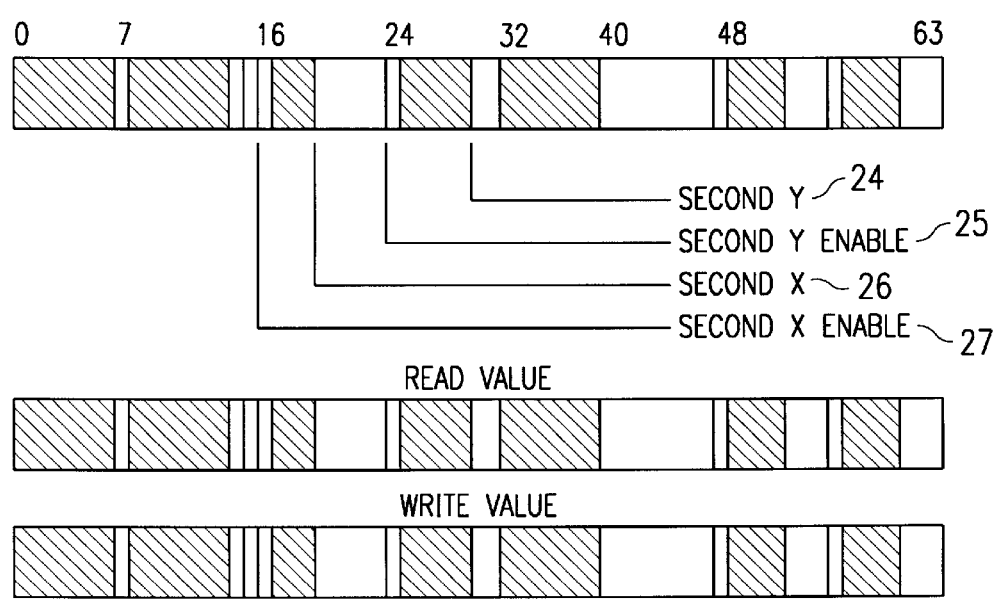
FIG. 5 is a schematic diagram of the ring control status and configuration register or CSR.

FIG. 5 describes the control status register 28 or CSR that is used in the secondary method. This register is implemented in each of the TACs on a node and each TAC on a node has the same information. The TACs are not shown in the figures. Each TAC stores the routing rules described above, in the CSR. Initially, the base rules are used, until the TAC detects a failed node, usually by a timeout occurring from a transaction request. The TAC then forwards an error message to the requesting processor, which through software, activates the modified rule set in each of the TACs, and provides information about the failed node to each TAC.

The TAC is also known as a toroidal access chip or a SCI controller. The TAC acts as an interface from the node to an SCI ring. Each TAC interfaces to two SCI rings, an X-dimension ring and a Y-dimension ring. Each node can have up to eight TACs and, since each TAC is capable of operating a separate ring, there can be a total of up to 8 SCI rings connecting sections of nodes in a single dimension, i.e. 8 X-dimension rings and 8 Y-dimension rings. The SCI interface rings are defined in the IEEE Standard for Scalable Coherent Interface (SCI), IEEE Std. 1596–1992 ISBN 1-55937-222-2, which is incorporated herein by reference. The TAC receives data requests from the node and places the request into the appropriate SCI ring. The TAC and the other individual components of each node, as well as a method and system for synchronizing the processors in a multi-processor system is discussed in the co-pending application entitled "TIME OF CENTURY COUNTER SYNCHRONIZATION USING A SCI INTERCONNECT" filed Sep. 27, 1996, Ser. No. 08/720,332, which is herein incorporated by reference.

The CSR 28 comprises the second Y enable 25 and the second Y field 24 and then the second X enable 27 and the second X field 26. When the second X enable bit is set it enables the hardware to compare the incoming X address to the second X bits. The determination as to whether a match was made is used to determine whether or not to change the routing of the packet. Similarly with the second Y enable and the second Y bits. The determination as to whether a match was made is used to determine whether or not to switch the packet.

This routing method allows a packet to be shifted around in a multi-dimensional SCI network, from any one node to another node, in a predictable and effective manner. This method allows for packets to be routed around failed SCI links and failed nodes such that all the remaining nodes remain accessible.

Although the present invention and its advantages have been described in detail, it should be understood that various changes, substitutions and alterations can be made herein without departing from the spirit and scope of the invention as defined by the appended claims.

What is claimed is:

1. A multi-processor computer system comprising:
   a two dimensional array of nodes having rows and columns, each node having at least one processor, and each node has a corresponding ID indicating a position of each node in the array;
   a plurality of interface rings, wherein the nodes in each row are linked together by at least one of the rings, and the nodes in each column are linked together by at least one of the rings;
   a plurality of controllers, with each node having at least one controller, and said one controller interfaces the node with two rings; one ring being in a column direction and the other ring being in a row direction;
   a data packet that includes an ID of a destination node, the packet is sent to a receiving controller in a receiving node, wherein the receiving controller compares an ID of the receiving node with the ID stored in data packet to determine whether a destination match has occurred; when the destination match has occurred, the controller accepts the data packet for processing by the node; and when the destination match has not occurred, the controller routes the data packet to an adjacent node; and
   a plurality of configuration registers, with each node having a respective configuration register, each configuration register stores information for routing the packet around a failed node, wherein if the destination match has not occurred, the controller compares the information stored in the configuration register with the ID of the destination node to determine whether a failed match has occurred; when the failed match has occurred, the controller routes the packet to a secondary adjacent node; and when the failed match has not occurred, the controller routes the data packet to the adjacent node;

wherein each configuration register in all of the nodes on each column on either side of the column of the failed node contain the column ID of the failed node, each configuration register in all of the nodes on each row on either side of the row of the failed node contain the row ID of the failed node; and wherein only four configuration registers contain both the row ID and the column ID of the failed node, and only the four configuration registers are enabled and all other configuration registers are disabled.

2. The multi-processor computer system according to claim 1, wherein:

the nodes number twenty eight; and the array is a four by seven arrangement of nodes.

3. A method for routing a data packet around a multi-processor computer system; the system comprising a two dimensional array of nodes having rows and columns, with each node having a corresponding ID indicating a position of each node in the array, wherein each node ID has a column ID indicating a column position of each node in the array; wherein each node includes a configuration register that stores information for routing the packet around a failed node, and each configuration register in all of the nodes on each column on either side of the column of the failed node contain the column ID of the failed node, and each configuration register in all of the nodes on each row on either side of the row of the failed node contain the row ID of the failed node; the method comprising the steps of:

comparing an ID of a destination node contained within the packet with an ID of a current node position of the packet to determine whether a destination match has occurred;

accepting the data packet for further processing by the current node when the destination match has occurred;

comparing, when the destination match has not occurred, a column ID of the destination node contained within the packet with a column ID of the current node position of the packet to determine whether a column match has occurred;

routing the data packet to a first node in an adjacent row when the column match has occurred;

routing the data packet to a second node in an adjacent column when the column match has not occurred;

comparing, when one of the nodes has failed and the destination match has not occurred, the information stored in the configuration register with the ID of the destination node to determine whether a failed match has occurred;

routing the packet to a secondary adjacent node when the failed match has occurred;

routing the packet to the adjacent node when the failed match has not occurred;

enabling all configuration registers that contain both the row ID and the column ID of the failed node; and disabling all other configuration registers;

wherein the step of comparing the information stored in the configuration register with the ID of the destination node to determine whether a failed match has occurred is performed only on the enabled configuration registers.

4. The method according to claim 3, wherein each node ID has a row ID indicating a row position of each node in the array, and a column match has occurred, the method further comprising the steps of:

comparing a row ID of the destination node contained within the packet with a row ID of the first node to determine whether a row match has occurred;

routing the data packet to a third node in a next adjacent row when the row match not has occurred; and accepting the data packet for further processing by the first node when the row match has occurred.

5. A method for routing a data packet around a multi-processor computer system; the system comprising a two dimensional array of nodes having rows and columns, with each node having a corresponding ID indicating a position of each node in the array, wherein each node ID has a row ID indicating a row position of each node in the array; wherein each node includes a configuration register that stores information for routing the packet around a failed node, and each configuration register in all of the nodes on each column on either side of the column of the failed node contain the column ID of the failed node, and each configuration register in all of the nodes on each row on either side of the row of the failed node contain the row ID of the failed node; the method comprising the steps of:

comparing an ID of a destination node contained within the packet with an ID of a current node position of the packet to determine whether a destination match has occurred;

accepting the data packet for further processing by the current node when the destination match has occurred;

comparing, when the destination match has not occurred, a row ID of the destination node contained within the packet with a row ID of the current node position of the packet to determine whether a row match has occurred;

routing the data packet to a first node in an adjacent column when the row match has occurred;

routing the data packet to a second node in an adjacent row when the row match has not occurred;

comparing, when one of the nodes has failed and the destination match has not occurred, the information stored in the configuration register with the ID of the destination node to determine whether a failed match has occurred;

routing the packet to a secondary adjacent node when the failed match has occurred;

routing the packet to the adjacent node when the failed match has not occurred;

enabling all configuration registers that contain both the row ID and the column ID of the failed node; and disabling all other configuration registers;

wherein the step of comparing the information stored in the configuration register with the ID of the destination node to determine whether a failed match has occurred is performed only on the enabled configuration registers.

6. The method according to claim 5, wherein each node ID has a column ID indicating a column position of each node in the array, and a row match has occurred, the method further comprising the steps of:

comparing a column ID of the destination node contained within the packet with a column ID of the first node to determine whether a column match has occurred;

routing the data packet to a third node in a next adjacent column when the column match has not occurred; and accepting the data packet for further processing by the first node when the column match has occurred.

7. A method for routing a data packet around a multi-processor computer system to a destination node and avoiding a failed node;

the system comprising a two dimensional array of nodes having rows and columns, with each node having a corresponding row ID and a corresponding column ID indicating a position of each node in the array, each node includes a configuration register that stores information for routing the packet around the failed node; each configuration register in all of the nodes on each column on either side of the column of the failed node contain the column ID of the failed node; each configuration register in all of the nodes on each row on either side of the row of the failed node contain the row ID of the failed node;

the method comprising the steps of:

enabling all configuration registers that contain both the row ID and the column ID of the failed node;

comparing a column ID of the destination node contained within the packet with a column ID of a first current node position of the packet to determine whether a first column match has occurred;

comparing, if the configuration register is enabled, the column ID of the destination node contained within the packet with a column ID of the configuration register of the first current node position to determine whether a second column match has occurred;

routing the data packet to an adjacent node in an adjacent column until either the first column match occurs or the second column match occurs;

comparing a row ID of the destination node contained within the packet with a row ID of a second current node position of the packet to determine whether a first row match has occurred;

comparing, if the configuration register is enabled, the row ID of the destination node contained within the packet with a row ID of the configuration register of the second current node position to determine whether a second row match has occurred;

routing the data packet to an adjacent node in an adjacent row until either the first row match occurs or the second row match occurs;

comparing a column ID of the destination node contained within the packet with a column ID of a third current node position of the packet to determine whether a third column match has occurred;

routing the data packet to an adjacent node in an adjacent column until the third column match occurs; and accepting the data packet for further processing by the node where the third column match occurred.

8. The multi-processor computer system of claim 1, wherein:

each ring is a SCI standard ring; and each controller is a SCI controller.

* * * * *

UNITED STATES PATENT AND TRADEMARK OFFICE
CERTIFICATE OF CORRECTION

PATENT NO. : 5,898,827  
DATED : April 27, 1999  
INVENTOR(S) : Bryan D. Hornung et al.

Page 1 of 1

It is certified that error appears in the above-identified patent and that said Letters Patent is hereby corrected as shown below:

Column 3,  
Line 9, delete "08/720,332" and insert therefor -- 08/720,330 --

Signed and Sealed this

Eleventh Day of June, 2002

*Attest:*

JAMES E. ROGAN  
*Director of the United States Patent and Trademark Office*

*Attesting Officer*